United States Patent

[11] 3,623,949

| [72] | Inventors | Janos Kollonitsch<br>Westfield;<br>Stephen Marburg, Plainfield, both of N.J. |
|---|---|---|
| [21] | Appl. No. | 856,472 |
| [22] | Filed | Sept. 9, 1969 |
| [45] | Patented | Nov. 30, 1971 |
| [73] | Assignee | Merck & Co., Inc.<br>Rahway, N.J. |

[54] PROCESS FOR THE PREPARATION OF 1-CHLORO-2-HYDROXYPROPYLPHOSPHONIC ACID
3 Claims, No Drawings

| [52] | U.S. Cl. | 195/1 |
|---|---|---|
| [51] | Int. Cl. | C12b 1/00 |
| [50] | Field of Search | 195/1, 28, 51 R; 260/990 |

[56] References Cited
UNITED STATES PATENTS

| 3,528,886 | 9/1970 | Niedleman et al. | 195/51 |
|---|---|---|---|
| 2,658,909 | 11/1953 | Crandall et al. | 260/990 |

OTHER REFERENCES

Hager, et al.; " Chloroperoxidase"; J. Biol. Chem. Vol. 241, p. 1769– 1777, 1966.

*Primary Examiner*—A. Louis Monacell
*Assistant Examiner*—Gary M. Nath
*Attorneys*—John Frederick Gerkens, J. Jerome Behan and I. Louis Wolk

ABSTRACT: Racemic 1-chloro-2-hydroxypropylphosphonic acid, salts and ester derivatives thereof are prepared by reacting propenylphosphonic acid, hydrogen peroxide, and chloride ion in the presence of the enzyme chloroperoxidase. The chlorohydrin compound is useful in preparing antibacterial materials.

PROCESS FOR THE PREPARATION OF 1-CHLORO-2-HYDROXYPROPYLPHOSPHONIC ACID

BACKGROUND OF THE INVENTION

This invention relates to novel method for the preparation of racemic 1-chloro-2-hydroxypropylphosphonic acid. The process involves reacting propenylphosphonic acid with peroxide and chloride ion in the presence of the enzyme chloroperoxidase.

DESCRIPTION OF THE INVENTION

An object of this invention is to provide a novel process for preparing 1-chloro-2-hydroxypropylphosphonic acid from known starting materials. A further object is to provide a process whereby the desired chlorohydrin phosphonic acid is obtained by enzymatic hydroxy-chlorination. Another object is to provide a process whereby a chiral molecule in the racemic form is prepared from a nonchiral substrate. Further objects will be evident from the following description of the invention.

On of the normal characteristics of reactions catalyzed by enzymes is the stereoselective and asymmetric formation of chiral or optically active molecules from nonchiral substrates. The novel process of his invention affords an exception to the general rule in that enzymatic hydroxy-chlorination of propenylphosphonic acid using the enzyme chloroperoxidase produces a racemic mixture of 1-chloro-2-hydroxypropylphosphonic acid rather than the optically active isomer.

In accordance with the present invention racemic 1-chloro2-hydroxypropylphosphonic acid, salts, and ester derivatives thereof are prepared by the reaction of propenylphosphonic acid with hydrogen peroxide and chloride ion in the presence of the enzyme chloroperoxidase.

The 1-chloro-2-hydroxypropylphosphonic acid obtained in accordance with the procedure of the present invention is useful in preparing racemic (cis-1,2-epoxypropyl) phosphonic acid, and the salts and ester derivatives thereof, which have antibacterial activity as described in Belgian Pat. No. 723,072.

In the preferred embodiment of this invention, propenylphosphonic acid is reacted with hydrogen peroxide and chloride ion in the presence of the enzyme chloroperoxidase. The reaction is conducted by slowly adding hydrogen peroxide to a solution of propenylphosphonic acid, chloride ion, and chloroperoxidase in an acidic buffer solution. The reaction may be run with the entire amount of enzyme present at the start of the process. However, it is preferable to commence the reaction with approximately one-half of the required amount of chloroperoxidase and to periodically analyze for enzymatic activity and when the activity has diminished to approximately one tenth of the original value, to add the additional chloroperoxidase.

The enzyme employed in the process of this invention, chloroperoxidase, is prepared from *Caladariomyces fumago* according to the procedure of Morris and Hager, J. Biol. Chem., 241, 1763 (1966).

The starting propenylphosphonic acid can be either in the cis or trans configuration. When the cis isomer is utilized as the starting material, threo-1-chloro-2-hydroxypropylphosphonic acid is obtained and the erythro compound is obtained when the trans isomer is employed.

The source of chloride ions in the novel process of this invention is not critical and can be alkali metal or alkaline earth metal chlorides such as sodium chloride, potassium chloride, magnesium chloride, calcium chloride, etc. The enzymatic hydroxy-chlorination may be conveniently carried out at atmospheric pressure and at room temperature. The pH at which the chloroperoxidase is effective in forming the chlorohydrin phosphonic acid is from about pH 2 to 4; the preferred pH is about 3.

At the conclusion of the reaction, the racemic (1-chloro-2-hydroxypropyl) phosphonic acid obtained may be isolated or converted to an ester derivative or salt, or it may be subjected to resolution to afford the optical isomers. The reaction solution may be concentrated in vacuo and then passed through an ion exchange column, for example a cationic ion exchange resin, to remove the metal ions from the solution. The free phosphonic acid may be obtained by treating the acidic eluate with water and isolating the acid by freeze-drying. An ester derivative of racemic (1-chloro-2-hydroxypropyl) phosphonic acid may be prepared by passing the concentrated reaction solution through a cationic ion exchange resin and then treating the acidic eluate with diazomethane in methanol to afford racemic dimethyl 1-chloro-2-hydroxypropylphosphonate.

Although the invention has been described in reference to the preparation of 1-chloro-2-hydroxypropylphosphonic acid, it should be apparent to those skilled in the art that other halohydrin compounds, for example bromo or iodo, can be prepared by employing bromide or iodide ions in place of chloride ions.

EXAMPLE 1

Hydrogen peroxide (0.055 M., 21 ml.) is added over a period of 8 hours to a solution of cis-propenylphosphonic acid (1 mmol.), potassium chloride (2 mmol.) and 25 mg. of chloroperoxidase —29 $\mu$/mg. in 20 ml. potassium phosphate buffer (pH 2.75). The solution is periodically assayed for enzymatic activity according to method of Morris and Hager, J. Biol. Chem., 241, 1763 (1966) and when, after 6 hours, the activity has diminished to one tenth of the original value, an additional 25 mg. of enzyme is added. The solution is concentrated in vacuo to 15 ml. and then passed through 30 ml. of Dowex 50×8 ($H^+$ form). The acidic eluate is concentrated in vacuo to an oil, which is treated in methanol with diazomethane. The methanolic solution is concentrated and the residue is chromatographed on a 100 g. silica gel H dry column using a chloroform-isopropanol mixture (92:8 by volume) as solvent and eluant. From the effluent is isolated 80 mg. of racemic threo-dimethyl-1-chloro-2-hydroxypropylphosphonate by distillation at reduced pressure; boiling point 45° C./0.05 mm., $[\alpha]_D$ :0 (C, 2 in methanol).

EXAMPLE 2

A 200 ml. beaker is charged with 20 ml. 0.3 M. phosphate buffer (pH 2.75) (6.0 mmol.), 149 mg. (2.0 mmol.) potassium chloride, 122 mg. (1.0 mmol.) trans-propenylphosphonic acid and 25 mg. of chloroperoxidase preparation (29 units/mg.) and enough water to dilute to 100 ml. Then a 30 percent hydrogen peroxide solution 20 ml. (0.055 M.) is added dropwise over a period of 4.5 hours. After 3 hours an additional 25 mg. of the enzyme preparation is added.

After the completion of the addition, the solution is concentrated to 15 ml. which is passed through a 30 ml. Dowex 50×8 ($H^+$ form) column. The acidic eluate is concentrated to dryness and the oil which resulted is dissolved in 25 ml. methanol and treated with diazomethane. The methanolic solution is concentrated, the residue dissolved in about 10 ml. of a chloroform-isopropanol (92:8) mixture, applied to a 150 g. silica gel dry column and chromatographed with the chloroform-isopropanol solvent. The fractions containing dimethyl 1-chloro-2-hydroxypropylphosphonate are combined and concentrated to afford 140 mg. of the ester, by distillation at reduced pressure.

Dowex 50×8 ($H^+$ form) is a sulfonated polystyrene cation exchange resin.

What is claimed is:

1. A process for preparing racemic 1-chloro-2-hydroxypropylphosphonic acid that comprises reacting together propenylphosphonic acid, hydrogen peroxide, and chloride ion in the presence of chloroperoxidase.

2. The process of claim 1 wherein the reaction is conducted at a pH of from 2 to 4.

3. The process of claim 1 wherein said racemic 1-chloro-2-hydroxypropylphosphonic acid is recovered as the dimethyl ester.